United States Patent [19]

Ferguson

[11] Patent Number: 5,344,020

[45] Date of Patent: Sep. 6, 1994

[54] STORAGE DEVICE FOR GOLF CARTS

[76] Inventor: Steve Ferguson, R.R. 3 Box 271, Galesburg, Ill. 61401

[21] Appl. No.: 68,779

[22] Filed: Jun. 1, 1993

[51] Int. Cl.$^5$ ............................................... B60R 7/08
[52] U.S. Cl. ..................... 224/274; 224/311
[58] Field of Search ................ 224/274, 311; 280/DIG. 5

[56] References Cited

U.S. PATENT DOCUMENTS 2,908,433 10/1959 West ..................................... 224/311
3,847,316 11/1974 McInnes .............................. 224/311
4,441,641 4/1984 Thompson ........................... 224/311

*Primary Examiner*—Renee S. Luebke
*Attorney, Agent, or Firm*—John A. Franczyk

[57] ABSTRACT

A storage device for attachment to the underside of the roof of a motorized golf cart is disclosed, comprising a generally rectangular construction, including a bottom shelf, side walls, one back wall, one or more internal dividers, a continuous lip that is used to attach the storage device to the underside of the roof of the golf cart, and a retaining lip across the opening of the storage device, wherein the retaining lip is designed to prevent accessories stored in the storage device from falling out of it while the cart is in motion or parked on an incline. The storage device is fastened to the underside of the roof of a golf cart by fastening members that are disposed in apertures in the continuous attachment lip, with matching apertures being placed in the roof of the golf cart to accept the fastening members. Gasket material is utilized along the entire attachment lip to effect a water-tight seal between the storage device and the roof of the golf cart. The device is suitably dimensioned for attachment to any golf cart.

7 Claims, 2 Drawing Sheets

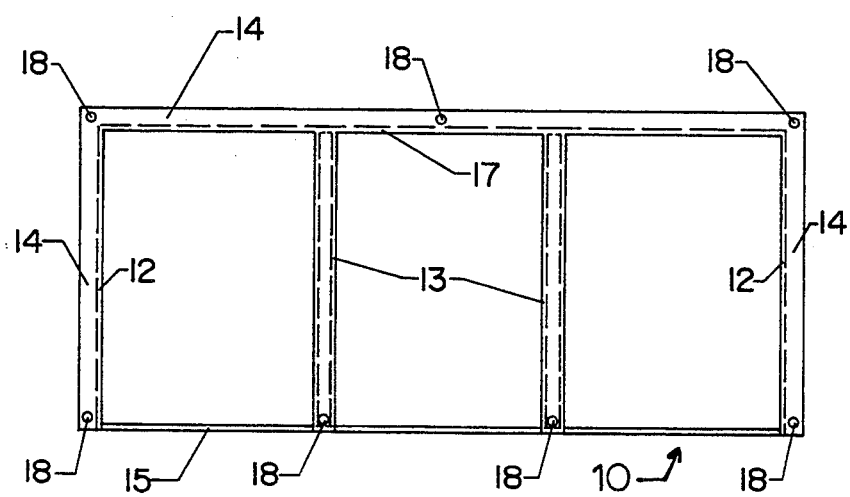
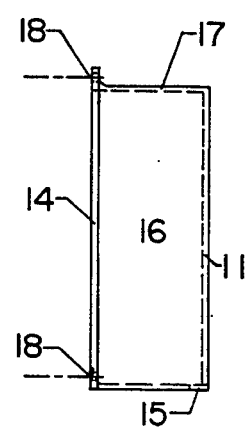
FIG. 3
FIG. 4
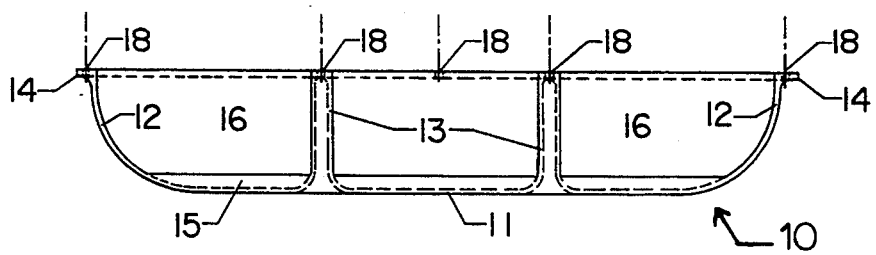
FIG. 2

STORAGE DEVICE FOR GOLF CARTS

BACKGROUND OF THE INVENTION

The present invention relates in general to an improved accessory storage device for motorized golf carts, and in particular to an accessory storage device that may be removably and portably attached to the underside of the roof of virtually any motorized golf cart. The storage device may then be used, for example, to store golf balls, tees, hats, and clothing while the golf cart is in use.

Golf is an increasingly popular game which requires its participants to traverse long distances over lengthy golf courses in pursuit of the object of the game. Each participant in the game generally must carry a complete set of golf clubs and related accessories, all of which are most-commonly carried in a standard golf bag. In an average game of golf, the participant will walk and carry his or her golf clubs and accessories over a distance of four to five miles.

To increase the speed of play of the game and to minimize fatigue, the participants will frequently utilize motorized golf carts. Rather than walking the distance of the course while carrying golf clubs and accessories, the participants will then ride in the carts over the distance of the golf course.

A standard motorized golf cart is constructed with seating for two participants, and with storage areas for two sets of golf clubs in standard golf club bags. While many golf carts are constructed without roofs or coverings over the seating area, roofs are a standard option that are available and are included on most golf carts. The roof structures are generally designed to shield the golf cart's riders from rain and other inclement weather, and to provide shade from intense sun. The storage area for the golf club bags is typically situated to the rear of the cart, and is either outside of the area protected by the roof structure or at the edge of that area, leaving the golf clubs and bags still somewhat exposed to the elements.

During the play of the game, the participants will frequently carry with them, either on their persons or in storage compartments in their golf club bags, a variety of accessories that may be used or desired in the play of the game. This includes, for example, extra golf balls, golf tees, towels, sweaters, sunglasses, hats, shoes, and other articles of clothing. Because of the inconvenience of frequently reaching into storage compartments on a golf club bag for these accessories, the participants who utilize motorized golf carts will place these items in more convenient locations in and around their golf carts. Although most golf carts are constructed with small storage areas for these items, none have any comprehensive structures that are designed exclusively for these items. As a result, the golf participants will attempt to improvise storage areas in the golf cart by placing accessories between or around the seats or on small dashboard-panels that are forward of the seating area. This is an imperfect solution, however, in that the accessories are not shielded from rain and inclement weather in these locations, nor can they be properly secured in these locations while the cart is moving.

Prior attempts have been made to integrate better storage areas into golf carts, and in particular into golf cart roofs. For example, U.S. Pat. No. 4,650,238 describes a roof structure for golf carts that is designed for storage of sets of golf clubs. The roof storage unit described in this patent provides access to its storage area from the outside of the golf cart only. If the golf cart's riders are caught in a rainstorm, it would be impractical for those riders to leave the shelter of the cart to gain access to this storage area. Moreover, if the cart is temporarily parked on an incline, nothing in the structure described in this patent would prevent the contents of the storage area from spilling out under the force of gravity. Finally, this roof storage unit is limited to storage of golf clubs, and omits any storage room for the many accessories that are required to play the game of golf.

Accordingly, the present invention has as one of its objects the provision of a storage device for motorized golf carts that may be easily and readily used for storage of golfing accessories.

It is a further object of the present invention to provide a storage device that may be removably attached to any golf cart that has a roof, regardless of the manufacturer of that cart or roof, or the shape or design of the roof.

Another object of the present invention is to provide a storage device that securely holds golfing accessories while the cart is in motion, or while the cart is parked on an incline.

Yet another object of the present invention is to provide a storage device that may be used by more than one golf participant, and that contains separate compartments to segregate each participant's accessories.

These and other objects of the invention will become apparent in light of the present specifications, drawings and claims.

SUMMARY OF THE INVENTION

This invention comprises an improved storage device that may be removably attached to the underside of the roof of any motorized golf cart. The improved storage device includes at least one, and may include multiple internal compartments to hold and segregate golf accessories, including golf balls, tees, and articles of clothing. The storage compartment is accessible from inside the cart, and includes a retaining lip to securely hold accessories in the compartment while the golf cart is in motion or while it is parked on an incline. The construction of the storage device further includes fastening means, and may include a gasket-like material by which the structure would be held and sealed tightly against the underside of the roof of any golf cart. The gasket-like material is pressed flush against the underside of the roof to create the storage compartment. Because the storage compartment is under the roof and may be accessed by individuals who are riding in the golf cart, the accessories that are stored in the compartment remain shielded from the weather under all conditions.

The present invention can further comprise multiple storage devices, each of which is attached to the underside of the golf cart roof to provide access to each unit from the golf cart seats.

In the preferred embodiment, the storage device of the present invention comprises a generally rectangular construction, including a bottom shelf, side walls, one back wall, one or more internal dividers, a continuous lip that allows for attachment of the storage device to the roof of the golf cart, and a retaining lip across the opening of the storage device, wherein the retaining lip is designed to prevent accessories stored in the storage device from falling out of it while the cart is in motion or parked on an incline. The storage device is fastened to the underside of the roof of a golf cart by fastening means that are disposed in apertures in the continuous attachment lip, with matching apertures being placed in the roof of the golf cart to accept the fastening means. Gasket material is utilized along the entire attachment lip to effect a water-tight seal between the storage device and the roof of the golf cart.

BRIEF DESCRIPTION OF THE DRAWINGS

FIG. 2 is an end view of one embodiment of the present invention, apart from the golf cart.

FIG. 3 is a top-down view of one embodiment of the present invention.

FIG. 4 is a side view of one embodiment of the present invention.

DETAILED DESCRIPTION OF THE DRAWINGS

Figure 1:
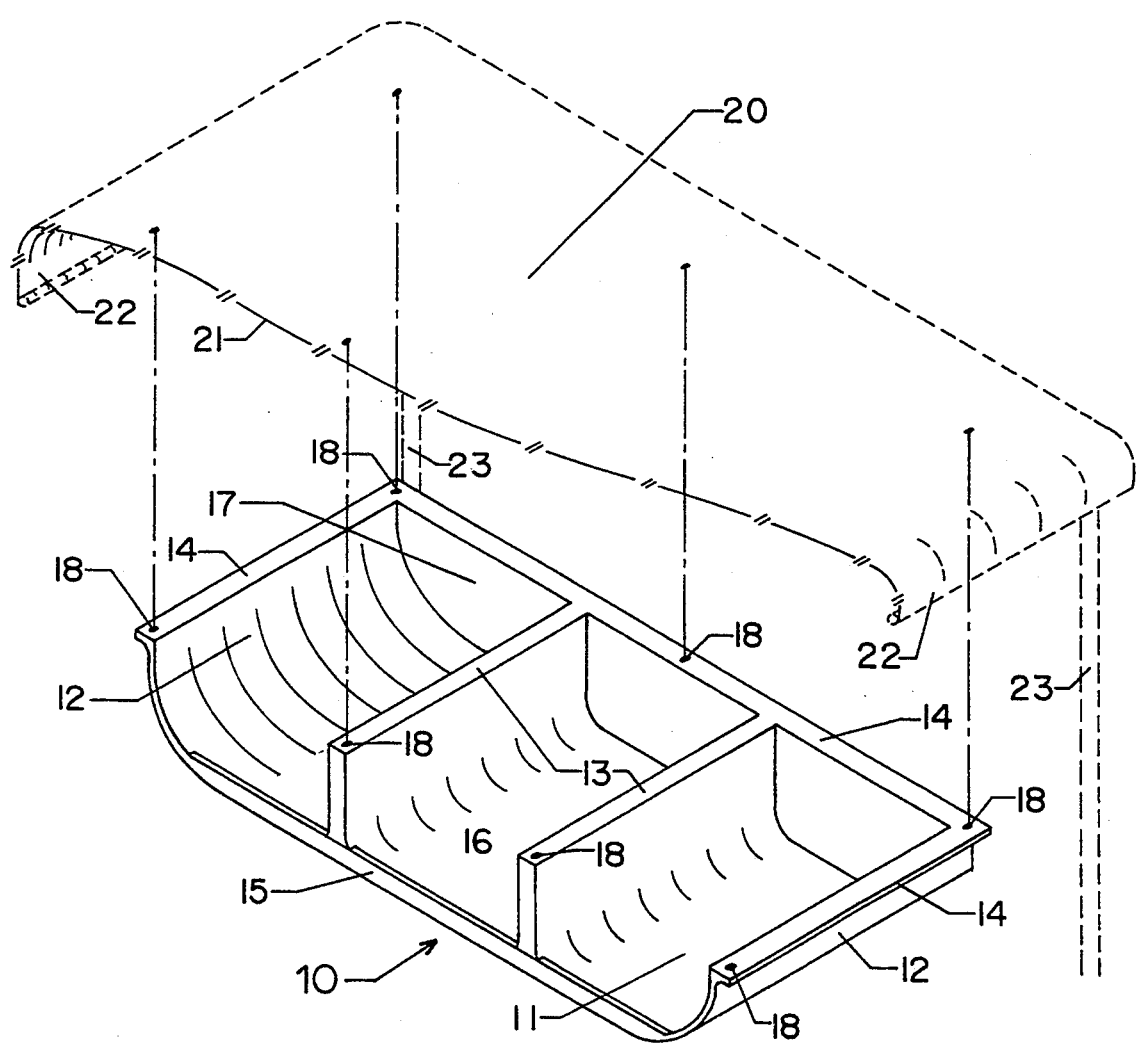
FIG. 1 is an overall view of the golf cart storage device of the present invention, showing how such device would be attached to the underside of the roof of a golf cart.

This invention is susceptible of embodiment in many different forms, the preferred embodiment of which shall be described in the present disclosure. The present disclosure is to be considered as an exemplification of the principles of this invention and is not intended to limit the invention to the embodiments illustrated.

The present invention 10 is shown in FIGS. 1 through 4. A preferred embodiment of the storage device of the present invention 10 is shown in FIG. 1. As shown in FIG. 1, storage device 10 is attached to the underside of the roof 20 of a motorized golf cart. The roof 20 is generally a flat planar structure with an upper generally planar surface 21, side overhangs 22 that are perpendicular to and downwardly opposed from the planar surface 21, and vertical tubular roof supports 23.

The storage device 10 is preferably attached to the forward portion of the underside of the planar surface 21 by any of a variety of attachment means that are well-known to persons skilled in the art. The maximum width and length of the device 10 are such that the device will fit completely under the golf cart roof 20 and within the boundaries formed by side overhangs 22. For those golf cart roofs in which the tubular roof supports continue along and inside of the side overhangs 22, the maximum dimensions of the device 10 are reduced accordingly to accommodate any reduction in the underside area that results from the presence of the continued tubular supports. Thus, the storage device 10 can be constructed for generic attachment to any golf cart roof.

As shown in FIG. 1, storage device 10 comprises a generally planar bottom structure 11, side structures 12 that are generally perpendicular to and upwardly opposed from bottom structure 11 and attached to opposite outer edges of bottom structure 11, one or more internal dividers 13 that are also generally perpendicular to and upwardly opposed from bottom structure 11, attachment lip 14, and forward retaining lip 15. The storage device 10 further includes back enclosure structure 17 that is generally perpendicular to and upwardly opposed from bottom structure 11 and attached to the back edge of bottom structure 11.

As shown in FIG. 2, when attached to the roof of the golf cart, the planar bottom structure 11, side structures 12, back structure 17, internal dividers 13, and the golf cart roof 20 form one or more open storage chambers 16. Each of the open storage chambers 16 is enclosed at the top and bottom and on three sides, leaving a fourth open end to accept various objects and accessories. The forward retaining lip 15 is large enough to prevent these objects and accessories that may be placed in chambers 16 from falling out of the chambers when the golf cart is in motion or when parked on an incline such that the front end of the golf cart if facing in an upward direction on the incline, but not so large as to prevent objects and accessories from being placed into or removed from the storage chambers. For complete closure of the storage chambers, hinged or sliding doors may be added to the open side of storage device 10.

As shown in FIG. 3, the attachment lip 14 continues along the entire upward edge of each of the side structures 12 and back structure 17 and forms an integral unit with these structures. When the storage device 10 is attached to the golf cart roof 20, the attachment lip is further completely in contact with the underside of golf cart roof 20 to form an integral storage unit with it. Likewise, the upward edge of each of the internal dividers 13 is completely in contact with the underside of golf cart roof 20 to fully enclose storage chamber 16 on all but one side. Although not shown on the drawings, a gasket material may be placed between the attachment lip 14 and the golf cart roof 20 to effect a complete, waterproof seal between the roof and the storage device.

Also as shown in FIG. 3, lip 14 and internal dividers 13 include a plurality of apertures 18. Each of the apertures 18 is situated to accept attachment means to attach storage device 10 to the golf cart roof 20 shown in FIG. 1. Any of a variety of suitable attachment means may be used including, by way of example but not by way of limitation, nuts and threaded bolts. In an embodiment utilizing nuts and threaded bolts, apertures that correspond to the apertures in the attachment lip are drilled into the golf cart roof and the bolt is inserted through each of the pairs of matching apertures. The storage device 10 is then firmly attached to the underside of the golf cart roof by tightening nuts onto the threaded ends of the bolts. Rubber or plastic washers may be used to effect a watertight seal around these apertures.

If the storage device 10 is no longer desired, it may then be easily removed from the underside of the golf cart roof simply by removing the attachment means. Any apertures that remain in the roof of the golf cart may then be filled in with any appropriate filler material if it is desired to permanently remove the storage device 10 from that particular golf cart.

As also shown in FIG. 2, the side structures 12 may be curved rather than flat and planar in nature, and the juncture of bottom structure 11 and side structures 12 may be smooth and continuous rather than right angular in nature. Although not shown in the drawings, the same curvatures may be adapted to the internal dividers 13 and the back structure 17. Adapting the curvatures to all of the side structures, back structure, and internal dividers allows for simplified manufacture of storage device 10 by way of injection molding.

FIG. 3 shows a top-down view of the storage device of the present invention. As shown in FIG. 3, lip 14 is continuous and unbroken, and runs entirely around the perimeter of the edges of the side structures 12 and back structure 17. Further, lip 14 and the top edge of dividers 13 form a continuous and unbroken surface, and all points of this surface are in contact with the underside of the golf cart roof when the storage device is attached to the roof. In this manner, the storage device and golf cart roof completely enclose storage chambers 16 except for one end which remains open. The golf participants then insert and remove accessories from the chambers 16 through the open end, and retaining lip 15 prevents any of these accessories from falling out.

FIG. 4 shows a side view of the storage device of the present invention. The bottom structure 11 need not be one continuous structure, but may comprise a plurality of bottom structures between dividers 13 shown in FIG. 3. In the embodiment consisting of curved side structures 12 and curved dividers 13, it is preferred to use a plurality of bottom structures to simplify the manufacture of storage structure 10.

The storage device of the present invention is generally attached to one end of the golf cart roof, with the open end of the storage device facing inward toward the center of the golf cart roof. In the preferred embodiment, the storage device 10 would be attached to the front end of the golf cart roof, leaving the open end of the storage chambers accessible to the riders of the golf cart forwardly from their seated positions. A plurality of storage devices 10 may be attached to golf cart roof 20, with the open end of each storage chamber being accessible to the riders of the golf cart. In one embodiment, the golf cart would have two storage devices, one forwardly displaced, and one rearwardly displaced relative to the center of the golf cart roof.

The storage device of the present invention would be readily manufactured by anyone familiar with any of several manufacturing arts. One commonly-available method would be to injection-mold the storage device either as one whole unit, or as two or more smaller pieces that would be combined to form a unitary structure. For example, if one were to manufacture the invention with only one internal divider 13, it could be manufactured as two separate halves and joined to form the integral unit by any number of methods.

The foregoing description and drawings merely explain and illustrate the invention, which is not limited to the description and drawings except to the extent that the appended claims are so limited, and those skilled in the art having this disclosure before them will be able to make modifications and variations to the disclosure without departing from the scope of the invention.

I claim:

1. An improved storage device for attachment to the underside of a roof of a golf cart, comprising:

a bottom, generally-planar shelf structure;
   side wall structures attached to the outer edges of opposite sides of the bottom shelf structure in an upwardly-disposed and generally perpendicular manner to the bottom shelf structure;
   a back wall structure attached to the rear outer edge of the bottom shelf structure in an upwardly-disposed and generally perpendicular manner to the bottom shelf structure, and generally perpendicular to the side wall structures;
   wherein the side wall structures and back wall structure are of generally equivalent heights;
   a retaining lip structure projecting upwardly from and perpendicular to the edge of the bottom shelf structure that is opposite to the edge of the bottom shelf structure to which the back wall structure is attached;
   wherein the height of the retaining lip structure is less than the height of the back wall structure and side wall structures;
   a continuous lip structure projecting outwardly from the upper edge of the side wall and back wall structures, and in a plane that is generally parallel to the plane of the bottom shelf structure; and
   means integrally included in the continuous lip structure for removably attaching the entire storage device to the underside of the roof of a golf cart.

2. The improved storage device described in claim 1, including one or more internal divider structures generally parallel to the side wall structures and perpendicular to the bottom shelf structure;
   wherein the height of the internal divider structures is generally equivalent to the height of the side wall structures and back wall structures.

3. The improved storage device described in claim 1, including a gasket material coincident with the continuous lip structure.

4. An overhead roof for a golf cart including the improved storage structure described in claim 1 attached to the underside of the roof.

5. An overhead roof for a golf cart including a plurality of the improved storage structures described in claim 1 attached to the underside of the roof.

6. A golf cart with an overhead roof and including the improved storage structure described in claim 1 attached to the underside of the roof.

7. A golf cart with an overhead roof and including a plurality of the improved storage structures described in claim 1 attached to the underside of the roof.

* * * * *